United States Patent [19]

Dannar

[11] Patent Number: 5,620,054

[45] Date of Patent: Apr. 15, 1997

[54] THREE POINT HITCH FOR AGRICULTURE EQUIPMENT

[76] Inventor: Charles L. Dannar, 8102 SE. 242nd, Gresham, Oreg. 97080

[21] Appl. No.: 471,306

[22] Filed: May 17, 1995

[51] Int. Cl.$^6$ .................................. A01B 51/00
[52] U.S. Cl. .................. 172/272; 172/47; 172/449; 172/450; 280/447; 280/186; 403/117; 403/181
[58] Field of Search ..................... 172/272, 117, 172/47, 210, 307, 449, 450, 451; 403/112, 113, 117, 116, 180, 181; 74/579 R; 280/186, 477, 461.1, 478.1, 400, 409, 407, 447, 454, 472, 476.1; 37/188, 435

[56] References Cited

U.S. PATENT DOCUMENTS

| Re. 31,013 | 8/1982 | Smith, Jr. ............................ 403/27 |
| 1,871,861 | 8/1932 | Rossman .......................... 74/579 R |
| 2,126,819 | 8/1938 | Schawlem .......................... 280/33.1 |
| 2,384,244 | 9/1945 | Forney .............................. 280/33.14 |
| 2,403,402 | 7/1946 | Rossi .................................... 287/103 |
| 2,673,507 | 3/1954 | Sawyer ................................ 97/47.14 |
| 2,674,169 | 4/1954 | Sawyer ................................ 97/47.14 |
| 2,721,087 | 10/1955 | Pearson ............................. 280/447 |
| 3,029,092 | 4/1962 | Stuart ................................. 280/477 |
| 3,220,751 | 11/1965 | Tweedale .......................... 280/461 |
| 3,489,431 | 1/1970 | McKeon et al. ................... 280/478 |
| 3,630,290 | 12/1971 | Williams et al. ...................... 172/7 |
| 4,284,146 | 8/1981 | Van Der Lely ...................... 172/47 |
| 4,738,461 | 4/1988 | Stephenson et al. ................ 280/400 |
| 4,915,575 | 4/1990 | Langenfeld et al. ................ 414/703 |
| 4,944,354 | 7/1990 | Langen et al. ....................... 172/47 |
| 4,986,367 | 1/1991 | Kinzenbaw ......................... 172/126 |
| 5,346,018 | 9/1994 | Koster .................................. 172/47 |

Primary Examiner—Terry Lee Melius
Assistant Examiner—Victor Batson

[57] ABSTRACT

An adjustable hitch having a body, the body connected to a first vehicle at a central point about which the body is rotatable. The body also includes a radially offset connecting point at which the body is rotatably connected to a second vehicle. The rotatable connections of the body to the first and second vehicles accomodates vertical offset between one or more links connecting the vehicle. The arc of rotation of the body may limited by a pair of protruding stops.

1 Claim, 3 Drawing Sheets

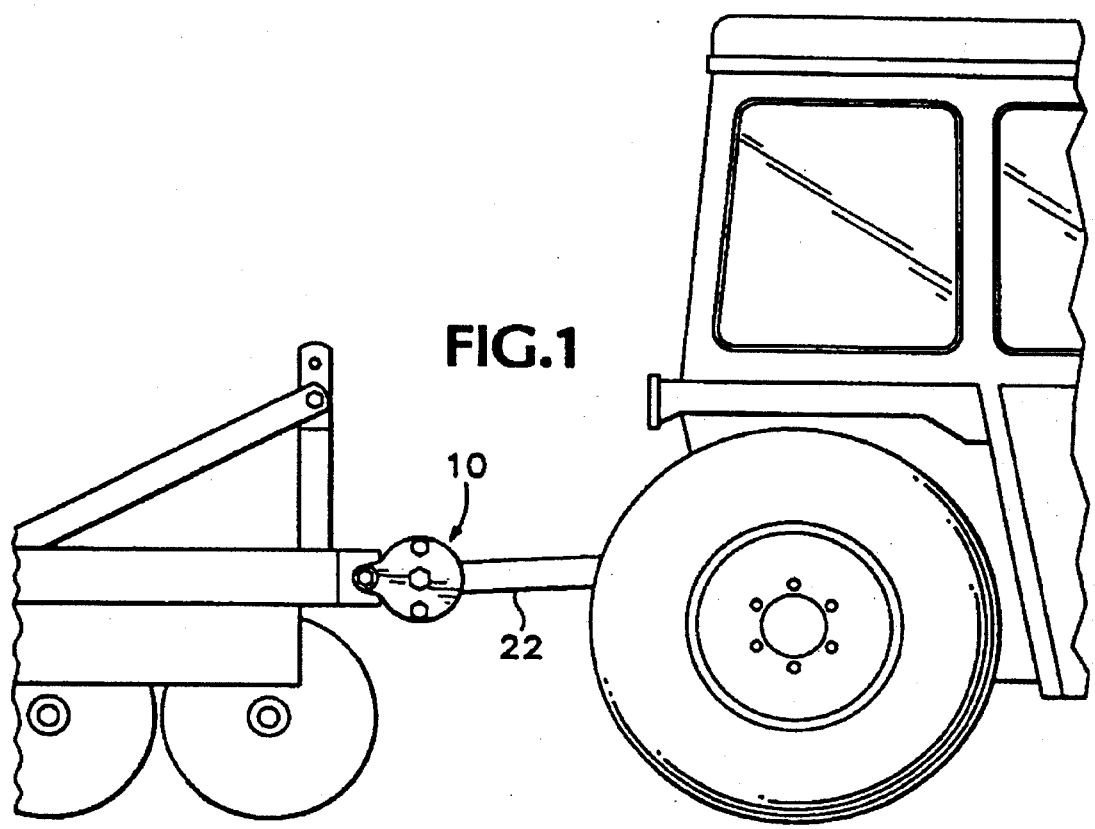
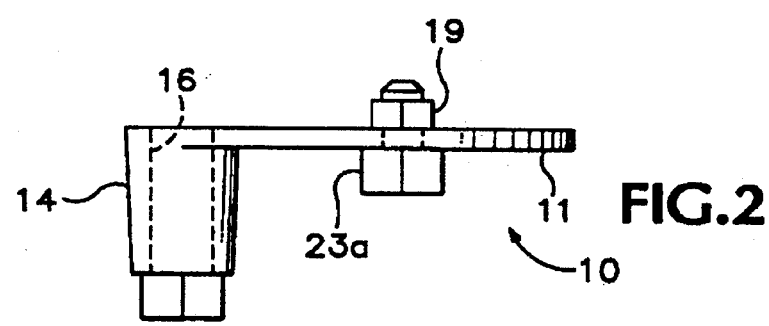
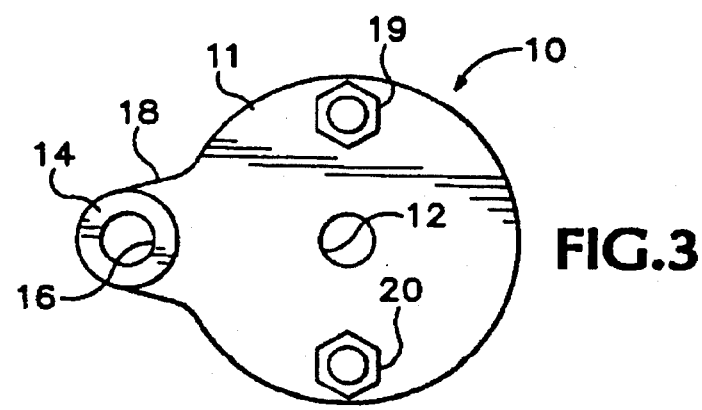

THREE POINT HITCH FOR AGRICULTURE EQUIPMENT

BACKGROUND OF INVENTION

The present invention relates to an improved hitch assembly for connecting a tractor to an agricultural implement or tool bar.

Agricultural implements must be repeatedly attached and detached from tractors, and are therefore equipped with detachable hitches for that purpose. Many types of hitch assemblies are known, the most widely used being the three-point, or Ferguson hitch. In the Ferguson hitch, three links extend rearwardly from the tractor, including two lower links lying generally in the same horizontal plane, and a third upper link centered above the lower links. Each link is operatively connected to a separate hydraulic cylinder operable by the tractor operator to raise and lower the links. The implement can be raised and lowered by simultaneous operation of all three links, while the depth of the implement can be controlled by extension or retraction of the upper link. The three-point hitch has one significant drawback, however. While the tractor and implement can be easily and quickly connected and disconnected on smooth, level ground, connecting and disconnecting can be difficult and time consuming on broken or slanted ground. Often the tractor or the implement must be repositioned numerous times to align the links.

A need, therefore, remains for an improved three-point hitch which embodies all the advantages of known three-point hitches, but which also accommodates quick and easy attachment and detachment of agricultural implements on broken ground or hillsides.

SUMMARY OF INVENTION

Applicant's invention is embodied in an adjustable hitch having a first body having a radial dimension and a transverse axis of rotation. The first body has a first transverse hole in the first body at the axis of rotation, and a second transverse hole in the first body, spaced radially apart from the axis of rotation. The first body is rotatable about the axis of rotation to a first position wherein the first and second transverse holes are vertically level, and is rotatable about the axis of rotation to a plurality of second positions wherein the first and second transverse holes are vertically offset. The body may include a pair of protruding stops which are spaced radially apart from the axis of rotation and which define a predetermined arc of rotation of the first body about the axis of rotation.

The invention may further comprise a link having a proximate end adapted for being connected to a vehicle and having a first distal end rotatably connected by a bolt or the like to the first body at the axis of rotation.

In another embodiment, the invention further includes a second body similar to the first body rotatably connected to a link having a second distal end. The second body is rotatable to a first position where the first and second transverse holes are vertically level, and to a plurality of second positions wherein the first and second transverse holes are vertically offset.

The invention will now be described in greater detail by reference to the drawings.

BRIEF DESCRIPTION OF THE DRAWINGS

FIG. 1 is a partial elevational view of the present invention being used to hitch an implement to a tractor.

FIG. 2 is a top plan view of a second embodiment.

FIG. 3 is a partial side view of the embodiment shown in FIG. 1.

DETAILED DESCRIPTION OF THE PREFERRED EMBODIMENT

Figure 4:
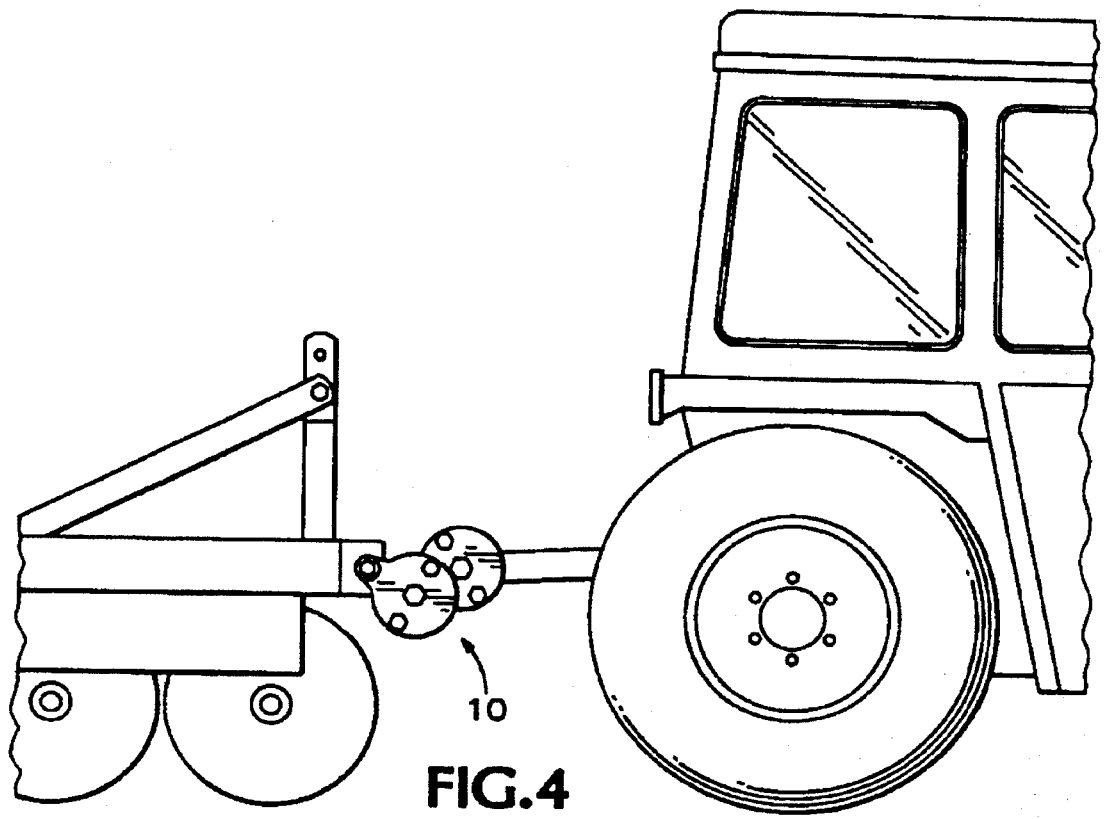
FIG. 4 is an enlarged, exploded, partial view of the embodiment shown in FIG. 2.
Figure 5:
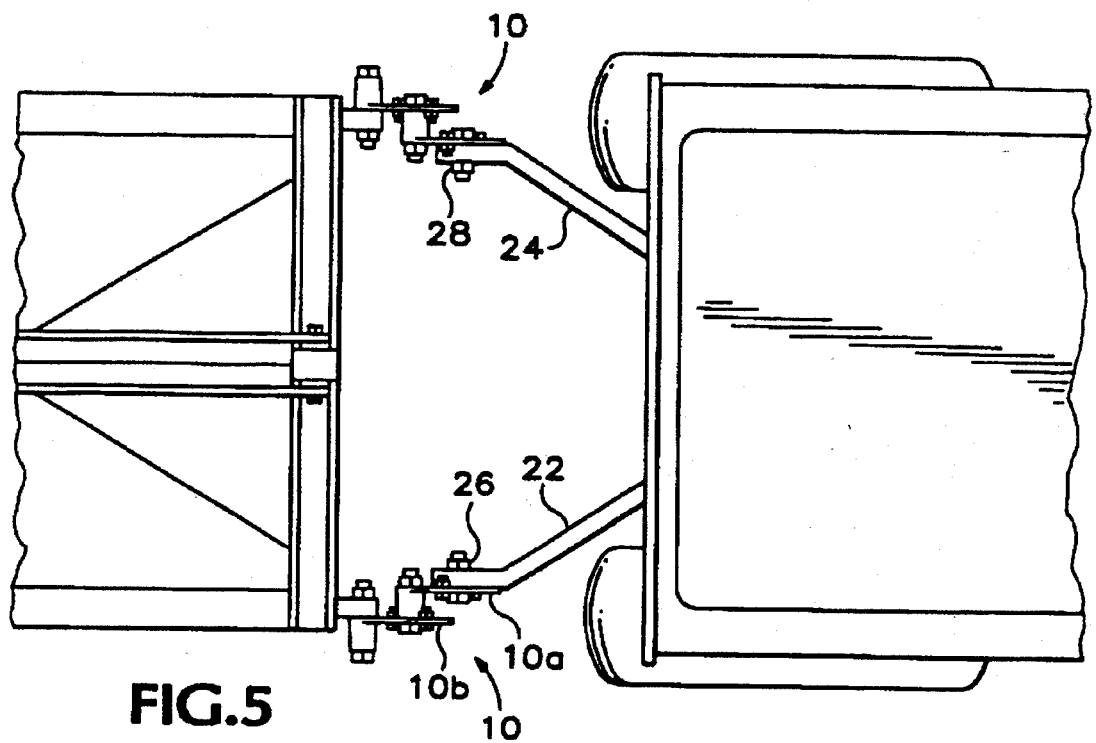
FIG. 5 is an enlarged partial view of the embodiment of the embodiment shown in FIGS. 1 and 2.
Figure 6:
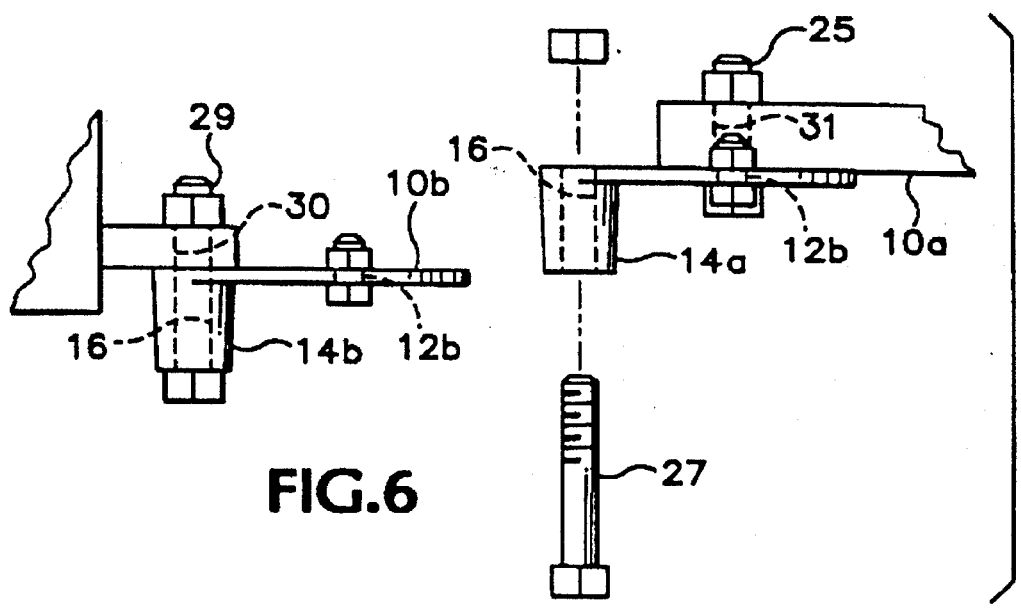
FIG. 6 is a partially exploded top plan view of another embodiment of the present invention.
Figure 7:
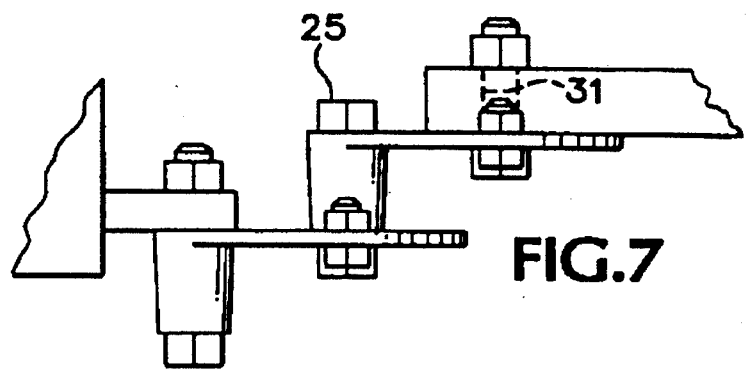
FIG. 7 is a top plan view of the embodiment shown in FIG. 6.

Referring now to the FIGS. 1–9, an improved hitch according to the present invention is shown at 10. In the preferred embodiment, as best seen in FIGS. 3 and 4, hitch 10 includes a flat and generally rounded body 11. A first transverse hole 12 is formed through the center portion of the body, and a transverse hollow boss 14 is coaxially aligned with a second transverse hole 16. In the preferred embodiment, boss 14 and hole 16 are located in arm 18 (FIG. 3) to maximize the offset between the transverse holes 14 and 16 without adding unnecessary weight. In alternative embodiments, body could be of any shape which provides the required offset. The hitch is preferably made of steel, although any other material having the required strength, wear resistance and durability could be substituted. Hitch 10 also includes a pair of stops 19 and 20 which limit the rotation of hitch 10 as described in more detail below. In use, hitch 10 is rotatably connected to a hitch link by a pin or bolt 23 through hole 12, and to an implement by a bolt through boss 14 and hole 16. If the tractor and the implement are misaligned during connection or disconnection, hitch 10 can rotate about hole 12 to accommodate the misalignment. Stops 19 and 20 limit he arc of rotation of hitch 10 to the point where the stops abut link 22. Stops 19 and 20 are shown in alignment with hole 12, although alternative positions could be used to provide greater or lesser arcs of rotation as desired.

In a second embodiment shown in FIGS. 4–9, hitches 10a and 10b, each of which is like hitch 10 described above, are connected in series to interconnect a tractor and implement. In the second embodiment, nut and bolt assembly 25 connects hitch 10a to link 22 through holes 12a and 31. Nut and bolt assembly 27 connects hitch 10a to hitch 10b through holes 14a and 12b. Hitch 10b in turn is connected to the implement with bolt 29 which passes through holes 14b and 30. Two hitches in series accommodates twice the normal misalignment between the tractor and the implement.

Figure 8:
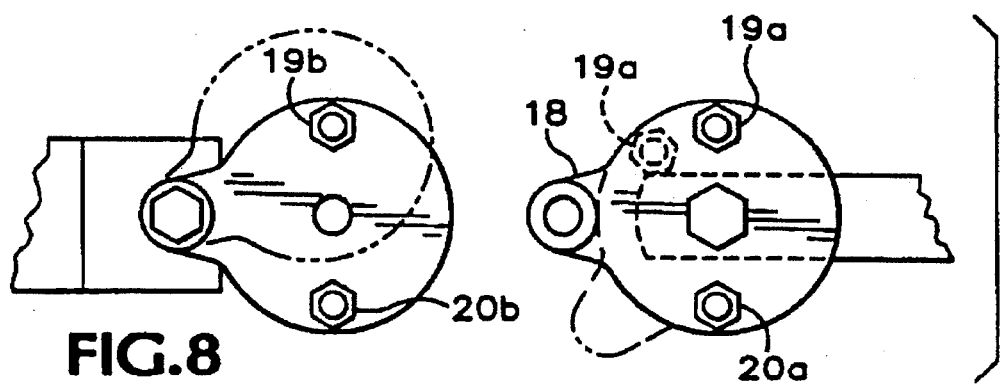
FIGS. 8 and 9 are side elevation views of the embodiment shown in FIG. 6.
Figure 9:
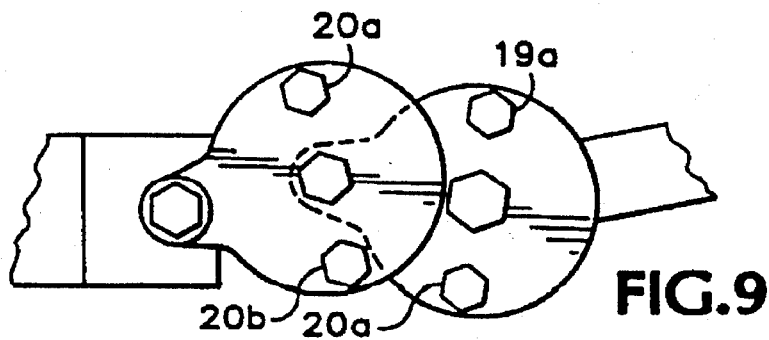

As best seen in FIG. 8, each hitch 10 includes stop lugs 19 and 20, which extend transversely through and protrude from the hitch. The stop lugs are positioned to engage the respective link arm or connecting arm when the hitch is rotated, and to thereby limit the arc of rotation of hitch 10, thereby allowing the tractor operator to maintain an acceptable degree of control over the implement, while still permitting some vertical misalignment of the lower links and connecting arms.

While the invention has been described in terms of the foregoing embodiments, the description is intended to be illustrative, and is not intended to limit scope of the following claims.

I claim:

1. A three point hitch comprising:

first and second lower link arms and an upper link arm, each said link arm having forward and rearward ends;

first and second articulated linkages connected to the respective rearward ends of the first and second lower link arms each said articulated linkage including a first connector having first and second transverse holes and first and second raised stops, and a second connector having first and second transverse holes and first and second raised stops, each said first connector rotatably connected to a respective link arm rearward end, and each said second connector rotatably connected to a respective first connector;

each first connector rotatable about its respective first transverse hole between a first position where its respective first raised stop engages an edge of the connected link arm, and a second position where the second raised stop engages an edge of the connected link arm;

each second connector rotatable between a first position where its first raised stop engages an edge of the first connector and a second position where its second raised stop engages an edge of the first connector.

* * * * *